June 15, 1954   H. B. COULTER   2,681,151
SKIMMING DEVICE FOR CLARIFICATION TANKS
Filed Feb. 24, 1953   4 Sheets-Sheet 2

INVENTOR.
Harold B. Coulter
BY William J. Fox
ATTORNEY

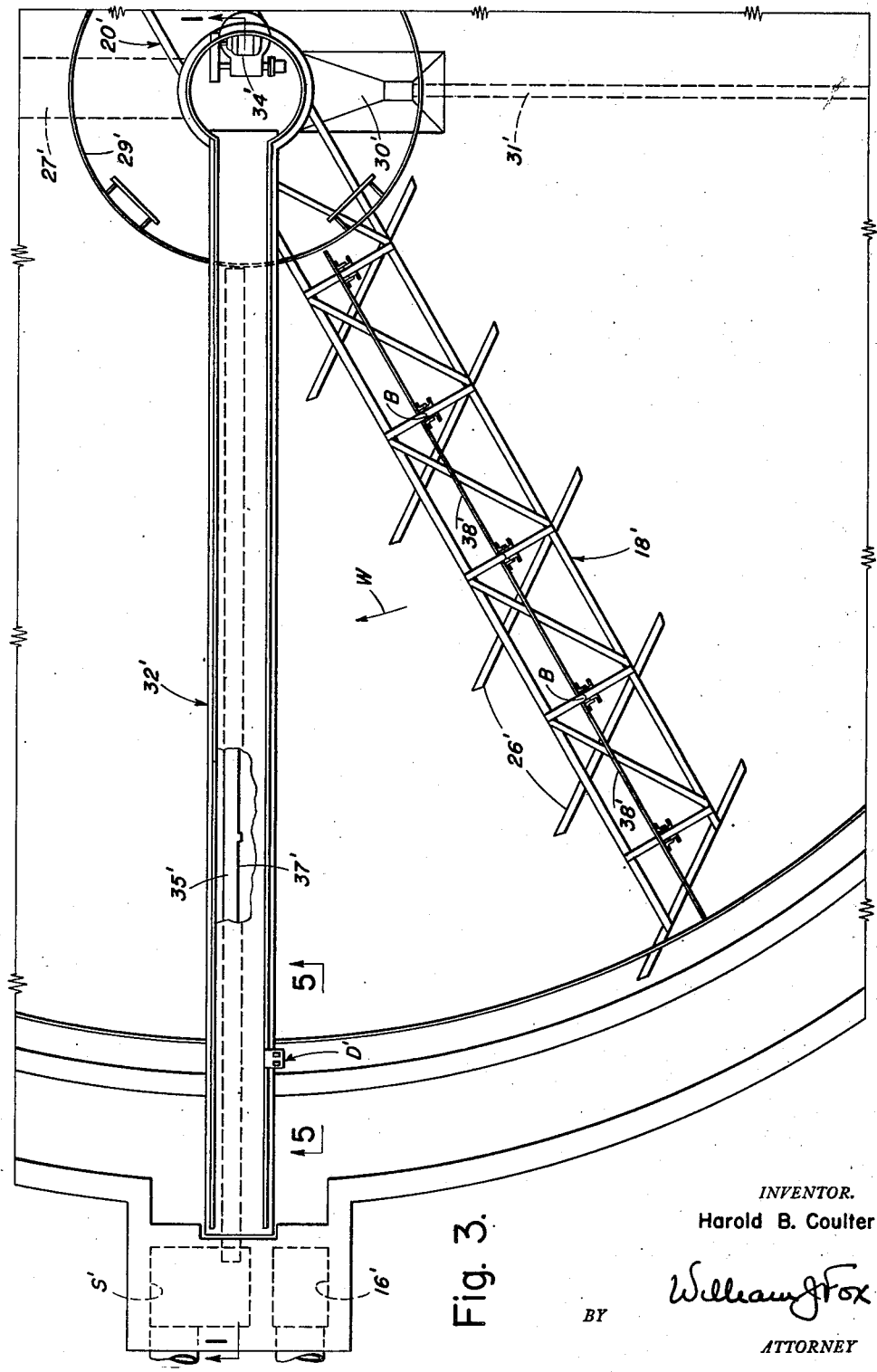

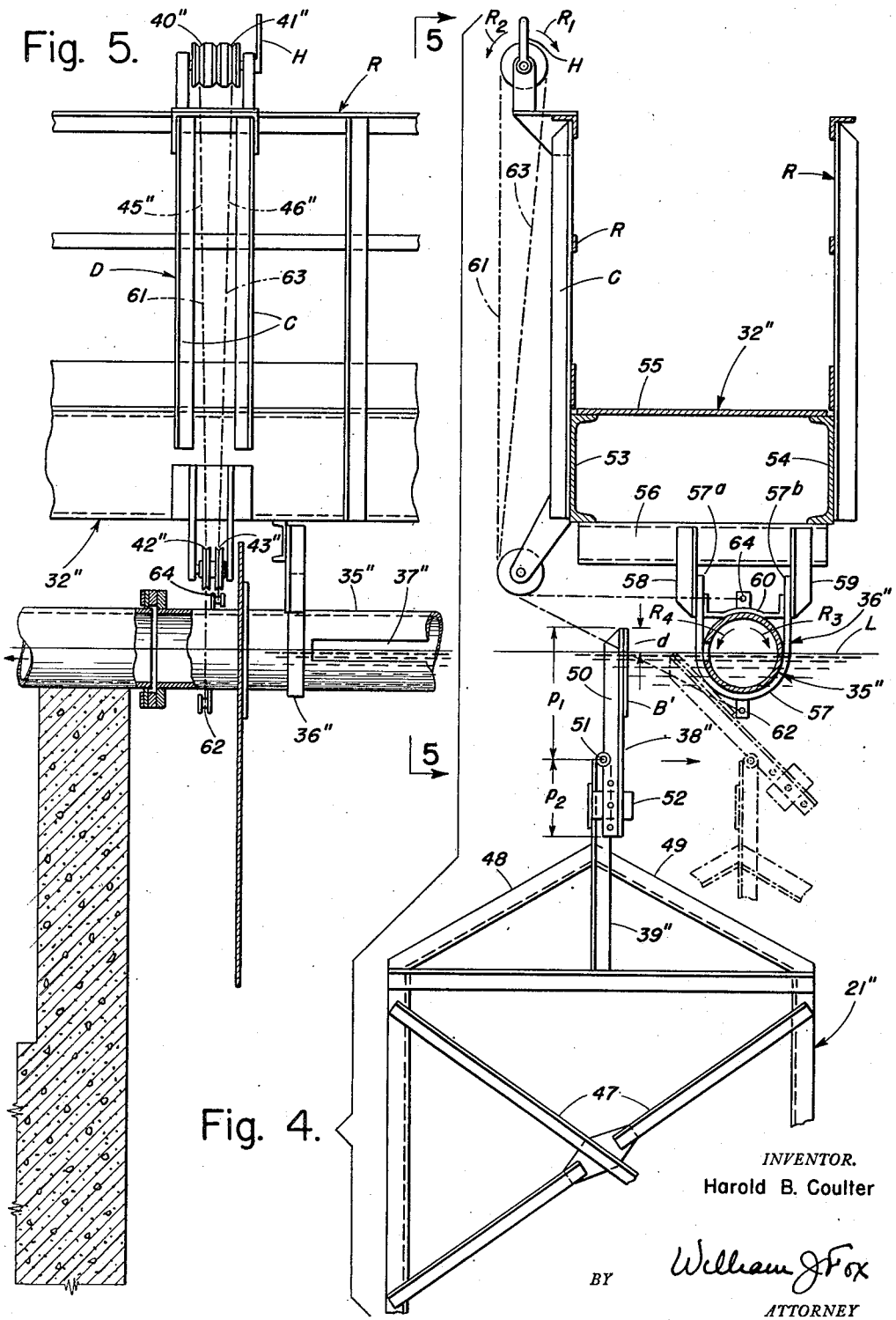

Patented June 15, 1954

2,681,151

UNITED STATES PATENT OFFICE 2,681,151

SKIMMING DEVICE FOR CLARIFICATION TANKS

Harold B. Coulter, Larchmont, N. Y., assignor to The Dorr Company, Stamford, Conn., a corporation of Connecticut Application February 24, 1953, Serial No. 338,400

4 Claims. (Cl. 210—51)

This invention relates to scum skimming devices or equipment for continuously operating clarifier or sedimentation tanks. A solids-carrying liquid is fed to such tanks at the center while settled matter or sludge is withdrawn from the bottom, with clarified liquid overflowing into a peripheral launder provided at the top of the tank. Such continuously operating clarifier tanks or units have a rotary mechanism which, while rotating, conveys the sludge over the tank bottom to a point of discharge or pocket or sump whence the sludge is usually pumped to a place of disposal outside the tank.

Scum skimming devices for such clarifier tanks comprise a scum skimming blade or blades rotating with the raking mechanism, and a stationary scum-receiving trough extending from the periphery of the tank radially inwardly along the overflow level of the liquid. Heretofore, the skimmer blade would deliver collected scum when passing across the receiving trough whence the scum flows or is pumped to a place of disposal outside the tank.

A problem arises with respect to the disposition and arrangement of the skimming device, where both the trough as well as the skimmer means above are of considerable length as in tanks of large diameter and where they are required to extend substantially along the full length of the radius of the tank, such problem being due to the difficulty of supporting a long free cantilevering length of trough from the wall of the tank. Similarly, it is difficult to support a corresponding length of skimming means from the central portion of the rotary raking structure.

According to this invention such difficulty is met and overcome by taking advantage of an overhead stationary truss or bridge structure often provided in such tank units, and by employing it as a mounting to support or suspend therefrom a stationary scum receiving trough, while providing upstanding skimmer means yieldably mounted upon and carried by one of the raking arms, in such a manner that their emerging upper free edge portion will sweep the scum towards and into the scum trough or channel incident to the rotation of the raking structure, then to continue yieldingly and submergedly underneath the scum trough, only to emerge again and thus to automatically re-assume scum-skimming position as the raking structure continues on another cyclone of scum skimming rotation.

An overhead supporting structure for the stationary scum receiving trough may have a variety of forms, for example, the form of a diametrically extending overhead construction sometimes employed for rotatably supporting the raking structure with its driving mechanism, or it may be in the form of a bridge structure employed in tank units where the raking structure is rotatably supported not upon the bridge structure proper, but upon a center pier, and the bridge structure extends from the tank wall to the center pier.

According to one feature, the skimmer means comprise a plurality of skimmer elements or blade members disposed in end-to-end relationship with respect to one another, and pivotally mounted upon the raking arm, while so weighted as to be normally urged into upright active scum-skimming position, but to tiltably yield into an inclined position upon contact with the trough to pass submergedly underneath the trough.

Further particularized, a feature provides a bridging connection of flexible sheet material between the mutually adjoining ends of a pair of skimmer blade members.

According to another feature, the weighted tiltabe skimmer elements are cooperatively associated with a scum trough having the form of a horizontal pipe provided with longitudinal scum receiving openings at one side thereof, which trough or pipe is rotatably positionable in a manner to adjust the scum receiving openings with respect to the overflow level of the liquid body in the tank.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents are therefore intended to be embraced by those claims.

In the drawings,

Figure 3 is a partial plan view of the tank unit taken on line 3—3 of Figure 2, including a view of the bridge construction and center pier, and of the scum receiving and discharge trough associated with the bridge construction.

Figure 4 is a vertical detail section of the bridge construction and skimming devices taken on line 4—4 of Figure 2.

Figure 5 is a side view taken on line 5—5 of Figure 4.

Figure 1:
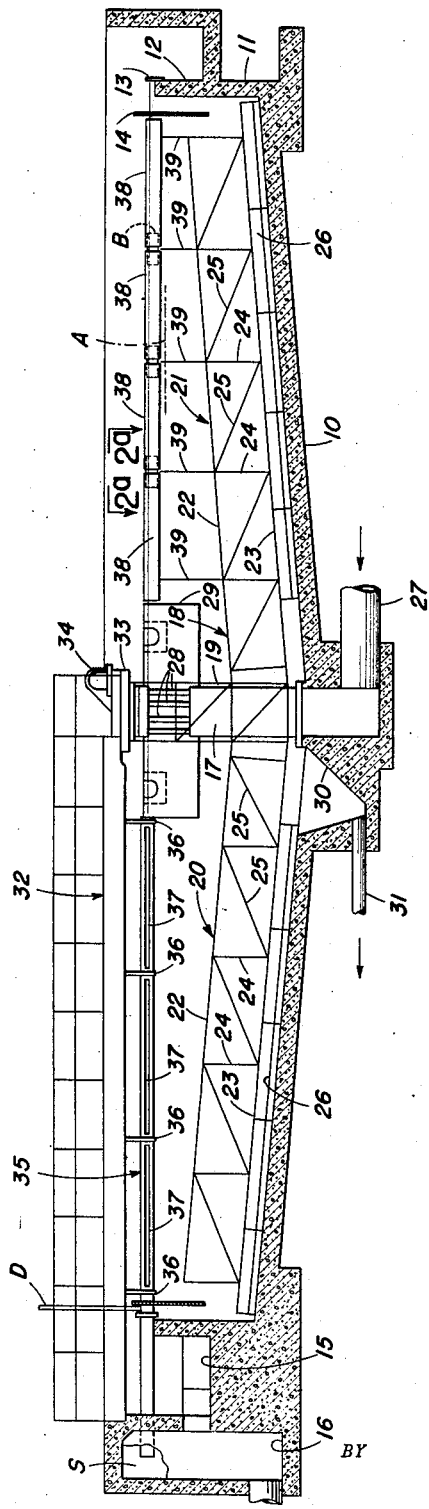
Figure 1 is an overall diagrammatic vertical sectional view of a center pier type tank unit with the novel scum skimming devices embodied therein.

According to Figure 1, the invention is embodied in a tank unit of the center pier type comprising a bottom 10, a wall 11, provided with effluent overflow launder 12, the overflow level being defined by a weir 13 which is associated with a customary cylindrical scum baffle 14 spaced inwardly from the weir and substantially concentric therewith. The overflow launder 12 is shown to have a discharge connection 15 leading to a discharge conduit 16. From the center of the tank bottom there rises a hollow pier 17 supporting a rotary raking structure 18 which in turn comprises a structural vertical cage construction 19 the top end of which has rotary bearing support upon the top end portion of the pier. A pair of raking arms 20 and 21 shown in the form of truss members extend in opposite directions with respect to each other from the lower end portion of the cage construction 19, the rake arms being diagrammatically indicated to comprise horizontal component members 22 and 23, vertical component members 24, and diagonal members 25, with usual sedimentation engaging blades 26 provided at the underside of these truss members.

An influent conduit 27 extends underneath the tank to carry feed liquid to the foot end of the pier 17, so that the liquid upflowing in the pier may be issued from feed openings 28 provided at the top end portion of the pier. A usual cylindrical feedwell 29 concentrically surrounds the upper portion of the pier and feed openings 28 such feed-well here being mounted upon the rake structure 18 to rotate therewith. A sludge collecting sump or pocket 30 is provided at the foot end of the pier to which the settled matter or sludge upon the tank bottom is conveyed by the rotation of rake structure 18, and from which pocket sludge is withdrawn or pumped to a place of disposal as indicated by a sludge discharge pipe 31. A stationary bridge construction 32 leads from the tank wall to an operating platform 33 upon the top end of the pier which platform is shown to carry a motorized driving mechanism or drive unit indicated at 34 for rotating the rake structure 18.

The scum skimming device according to this invention is here diagrammatically indicated to include a scum receiving trough in the form of a horizontal pipe 35 supported from and mounted at the underside of bridge construction 32 and shown to lead into a separate discharge conduit indicated at S. Points of support for this scum receiving pipe are indicated at 36, horizontally elongated scum receiving openings 37 in the pipe are indicated to extend along one side of the pipe and between respective supporting points 36. The supports 36 permit rotational adjustment of pipe 35, and a device for executing such adjustment is indicated at D mounted upon the bridge construction 32.

Skimmer means carried by the rake arm 21 are diagrammatically indicated in the form of a series of skimmer blades 38 disposed in an end-to-end relationship with respect to one another and so as to extend horizontally above and along the arms 21, yet so mounted thereon as to be yieldable or swingable about a horizontal axis indicated at A. That is to say, upright supporting means indicated as by upright supporting members 39 rise from the arm structure 21 to provide at the top end portions pivotal bearing means for the individually swingable skimmer blades 38. The scum skimming device and other details will be shown and described in greater detail and more fully implemented in connection with the remaining Figures 2, 2a, 3, 4 and 5.

Figure 2:
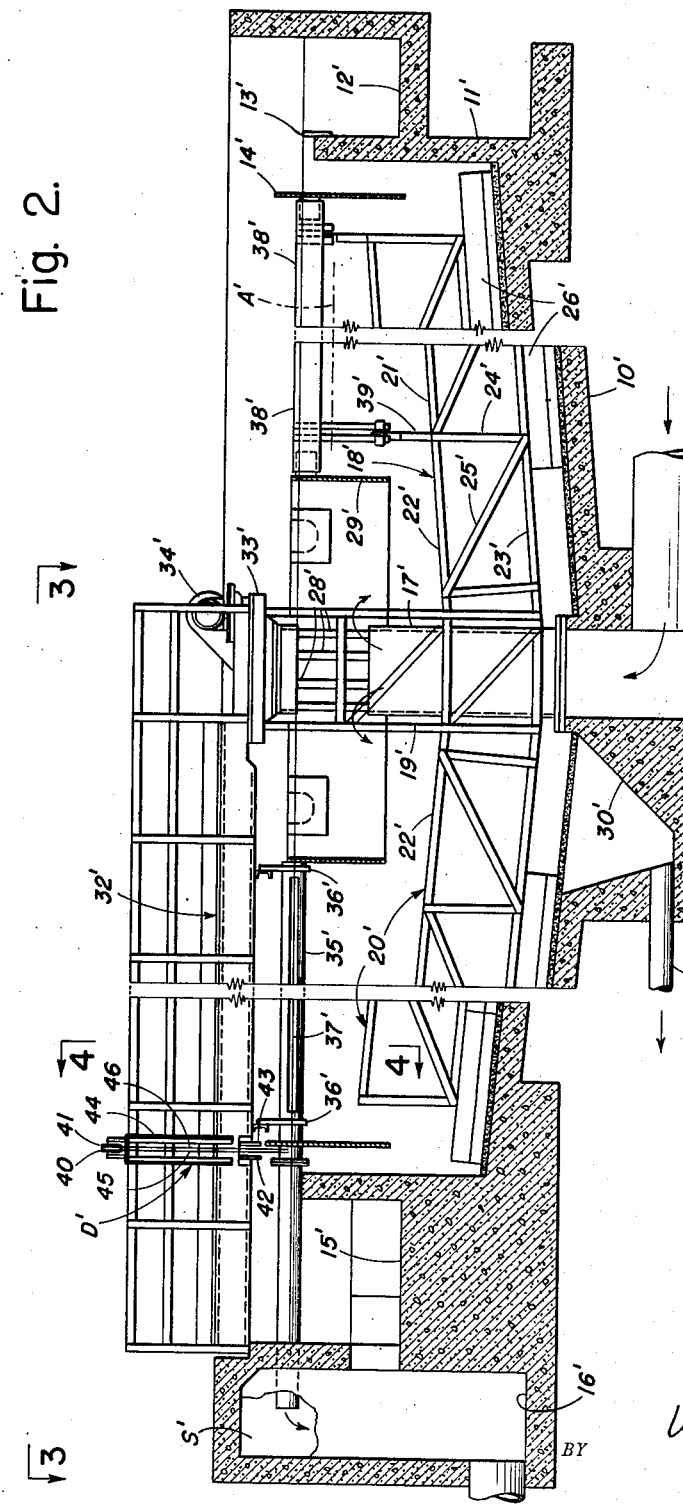
Figure 2 is an enlarged view of the tank unit of Figure 1 showing the construction thereof and of the skimming devices more fully implemented.

In Figure 2, a tank being similar to that of Figure 1 although with intermediate portions broken away so it appears horizontally foreshortened, comprises a bottom 10', a wall 11', provided with effluent overflow launder 12', the overflow level being defined by a weir 13', having a customary cylindrical scum baffle 14' spaced a inwardly therefrom and concentrically therewith. The overflow launder has a discharge connection 15' leading to discharge conduit 16'. From the center of the tank bottom there rises a pier 17' supporting a rotary rake structure 18' which in turn comprises a central vertical cage construction 19' the top end of which has a rotary bearing supported upon the top end portion of the pier. A pair of rake arms 20' and 21' in the form of truss structures extend in opposite directions with respect to each other from the lower end of the cage construction 19', which rake arms are indicated to comprise horizontal component members 22', and 23', vertical members 24', and diagonal members 25', with the usual sediment engaging blades 26' provided at and fixed to the underside of these truss structures or raking arms. An influent conduit 27' extends underneath the tank to carry feed liquid to the foot end of the hollow pier so that the liquid upflowing in the pier may issue from feed openings 28' provided at the top end portion of the pier. A usual cylindrical feedwell 29' concentrically surrounds the upper end portion of the pier and thus the feed openings 28', such feedwell being here mounted upon the rake structure 18' to rotate therewith.

A sludge collecting sump or pocket 30' is provided at the foot end of the pier to which sediment is conveyed over the tank bottom by the rotation of the structure 18', and from which pocket sludge is withdrawn or pumped as is indicated by a sludge discharge pipe 31' leading from the sump.

A stationary bridge construction 32' leads from the tank wall to an operating platform 33' atop the pier which platform carries motorized driving mechanism or a motor drive unit 34' for rotating the rake structure 18'.

A scum receiving trough in the form of a horizontal pipe 35' is supported from and mounted at the underside of bridge construction 32' and is shown to lead into a separate discharge conduit S'. Points of support for the pipe 35' are in the form of bearing members indicated at 36' allowing for rotational adjustment of the pipe while horizontally elongated lateral scum receiving openings 37' in the pipe are indicated to extend between respective bearing members 36'.

A device D' for rotatably adjusting the pipe 35' in bearing members 36', that is to say, a device for adjusting the scum receiving openings 37' relative to the liquid overflow level comprise a pair of upper pulleys 40 and 41, a pair of lower pulleys 42 and 43, bracket means 44 mounting the pulleys upon the bridge construction 32', and linear flexible motion transmitting means or pull wires 45 and 46 engaging these pulleys and attached to and anchored upon respective sides of pipe 35' in such a manner that joint rotation of the upper pulleys in either the one or the other direction will rotate the pipe 35' in a corresponding direction to make the desired adjustment above referred to.

Skimmer blades 38' are carried by the rake arm 21', disposed in end-to-end relationship with respect to one another to extend horizontally above and along the arm 21', said skimmer blades being furthermore mounted so as to be swingable or yieldable about a horizontal axis A'. Upright members 39' rise from the rake arm structure 18' for thus swingably supporting the skimmer blades 39'.

Figure 2A:
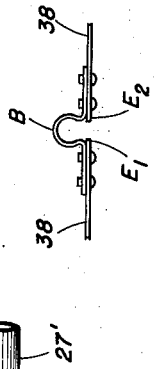
Figure 2a is a detail top view taken on line 2a—2a in Figure 2, showing a flexible bridging between mutually adjoining ends of a pair of skimming blade members.

Provision is made for preventing the escape of floating substance through a clearance existing between the mutually adjoining ends of a pair of skimmer blade members 38 of Figure 1 or 38' of Figure 2. Therefore, the detail Figure 2a shows in plan view a loop-shaped bridging strip B of flexible material such as plastic sheeting, fastened to the respective ends E₁ and E₂ of the skimmer blades.

Figures 4 and 5 are details of the scum skimming device and of some of its associated structures such as the rake arm structure 21" and of the bridge construction 32". That is to say, the rake arm structure 21" is in the form of a box type truss structure having internal diagonal transverse bracing 47. Upright members 39" rise from the top of this truss structure (corresponding to the member 39' in Figure 2 and 39 in Figure 1) which upright members have inclined bracing members 48 and 49 between them and the respective upper corners of the box type structure 21". A skimmer blade structure here designated as 38" (corresponding to the member diagrammatically shown at 38' in Figure 2 and member 38 in Figure 1) has transverse vertical arms 50 whereby a skimmer blade B' proper is pivotally mounted as at pivot points 51 upon the respective upright member 39". Thus, the skimmer structure 38" of Figure 4 comprises an upper arm portion $p_1$ extending upwardly from pivot point 51, and a lower arm portion $p_2$ extending downwardly from pivot point 51, the latter portion $p_2$ being provided with a weight member 52 preferably adjustable along the portion $p_2$. The skimmer structure of 38" has an upper portion $d$ of the skimmer blade B' proper normally emerging from and above the liquid level L.

The bridge construction 32" according to detail Figure 4 comprises a pair of horizontal structural channel members 53 and 54 interconnected at the top as by top plates 55 and interconnected at the bottom as by transverse tie members 56 which later in turn serve for mounting the supporting or bearing means 36" for pipe 35" comprise a U-shaped cradle member 57 having upright shank portions 57a and 57b the end portions of which are fastened and fixed to a pair of bracket members 58 and 59 which in turn are fixed to and extend downwardly from a respective transverse tie member 56. A confining strip or saddle element 60 extends and is fastened to the upright shanks 58 and 59 respectively of the cradle member, holding the pipe 35" in place although rotatably within the cradle member 57.

Actuating means for rotatably adjusting the pipe 35" comprise an upper pair of pulleys 40" and 41" and a lower pair of pulleys 42" and 43", both pairs of pulleys being mounted upon a bracket construction C fastened to the channel member 53 as well as to a railing construction R shown to constitute part of the bridge construction 32". A flexible motion transmitting element such as a pull wire 61 engages upon upper pulley 40" as well as upon lower pulley 42" and has its lower end anchored upon a lug 62 provided upon the underside of pipe 35". A second pull wire 63 engages upon the other upper pulley 41" as well as upon the lower pulley 43" and has its lower end attached to an anchoring lug 64 provided upon the top side of pipe 35". Thus by turning a handle H either in the direction of arrow $R_1$ or of arrow $R_2$ (see Figure 4) the pipe 35" can be adjusted rotationally in corresponding directions. By turning the handle in the direction of arrow $R_1$ the pipe will turn in the direction of $R_3$, whereas by turning the handle in the direction of $R_2$ the pipe will turn in the direction of arrow $R_4$. Instead of the pulleys and the pull wires 61 and 62, any equivalent actuating means for example, sprockets and chains may be employed.

The operation of the skimming device is substantially self explanatory from the drawing figures, and particularly from Figure 4. Where the influent liquid comprises, for example, a mixture of oil, water, and settleable solids, the liquid entering through influent conduit 27' (see Figure 2) rises through center pier 17' to the discharge openings 28' at the top end thereof, thence flows radially in all directions into the space defined by the cylindrical feed well 29'. The feed well gives the flow a downward direction to encourage the solids to settle, while the waters along with the lighter component such as oil continues to flow radially in all directions through the annular zone of quiescence between the feedwell and the overflow 13'. Within this quiescent zone the lighter liquid component or oil has an opportunity to, and does rise to the surface so that a floating layer of oil will be confined within the annular area between the feedwell 29' and the cylindrical baffle 14'.

The raking structure 18' rotates being driven by the drive unit 34', engages settled solids to convey them over the tank bottom inwardly towards the center pier and into the pocket 30' for withdrawal; at the same time the skimmer blades 38' (in Figure 2) or blade B' (in Figure 4) in their then upright position convey the floating component or oil along the liquid surface to the receiving pipe 35' as is indicated by arrow W in Figure 3. Thus with each cycle of rotation of the raking structure there is delivered into the receiving pipe 35' by way of the receiving openings, 37' therein a quantity of the floating water or oil, namely substantially the quantity that accumulates at the surface within the time of a single revolution of the raking structure. The oil or floating matter is thus delivered through and from the receiving pipe 35' into the discharge conduit S" for further disposal. From Figure 4 it will be seen that whenever the skimming blades B' in delivering the oil for discharge reach and enter into contact with the receiving pipe 35', the continued motion of the raking structure will cause the blades 38' to be tilted or deflected rearwardly as indicated by the dot-and-dash line position of the blade in Figure 4, and thus to "duck" under and past the receiving pipe, thereafter to return to its normal vertical active position as the raking structure commences a new cycle of rotation. Since the skimming blades 38' are connected with one another endwise by such flexible elements as the loops B (see Figures 2 and 2a), it will be seen that the sum total of the blades act as one, so that the floating oil is conveyed effectively towards the receiving pipe 35', namely without escape through the clearances between respective endwise adjoining ends of the blades.

I claim:

1. In a liquid treatment tank for clarifying liquid, supply means for feeding to the tank liquid to be clarified, having peripheral overflow means determining the liquid level of a body of liquid in the tank, a rotary sediment raking structure provided with at least a pair of radially extending rake arms, drive means for rotating the raking structure, and having means for discharging sediment from the tank bottom, a skimming device comprising a scum receiving trough extending radially of the tank and stationary overhead supporting means therefor, and skimmer means comprising a skimmer blade element and means for yieldably mounting the same upon one of said arms, whereby said blade element is normally urged into active scum conveying condition with its free upper edge portion emerged from the liquid in the tank to deliver scum to and into said trough and adapted to yield upon contact with said trough incident to the rotation of said raking structure for submergedly passing underneath the trough and thereafter to be urged to re-assume its emerged scum conveying condition.

2. The skimming device according to claim 1, in which said mounting means are characterized thereby that the blade element is pivotally and tiltably mounted and is weighted for urging the blade into active scum conveying position.

3. The skimming device according to claim 1, in which said scum receiving trough is in the form of a rotatably positionable pipe having laterally disposed horizontally elongated scum receiving openings.

4. The skimming device according to claim 1, in which the tank has a center pier for rotatably supporting the raking structure, and in which said stationary overhead supporting means for the trough comprise a bridge construction between the tank wall and the center pier.

References Cited in the file of this patent

UNITED STATES PATENTS

| Number | Name | Date |
| --- | --- | --- |
| 2,062,988 | Callow | Dec. 1, 1936 |
| 2,067,277 | Miick | Jan. 12, 1937 |
| 2,078,266 | Morehead | Apr. 27, 1937 |
| 2,086,730 | Miick | July 13, 1937 |
| 2,237,172 | Briggs | Apr. 1, 1941 |
| 2,249,049 | Sayers et al. | July 15, 1941 |
| 2,253,500 | Arango | Aug. 26, 1941 |
| 2,263,167 | Dorr et al. | Nov. 18, 1941 |
| 2,455,338 | Lind | Nov. 30, 1948 |
| 2,473,297 | Parker | June 14, 1949 |
| 2,611,489 | Scott | Sept. 23, 1952 |

FOREIGN PATENTS

| Number | Country | Date |
| --- | --- | --- |
| 390,989 | Great Britain | Apr. 20, 1933 |